United States Patent [19]

Carver et al.

[11] Patent Number: 4,815,141

[45] Date of Patent: Mar. 21, 1989

[54] APPARATUS AND METHODS FOR REMOVING UNWANTED COMPONENTS FROM A COMMUNICATIONS SIGNAL

[75] Inventors: Robert W. Carver, Snohomish; Victor O. Richardson, Seattle, both of Wash.

[73] Assignee: Carver Corporation, Lynnwood, Wash.

[21] Appl. No.: 937,118

[22] Filed: Dec. 2, 1986

[51] Int. Cl.⁴ ............................................. H04B 15/00
[52] U.S. Cl. ........................................ 381/94; 381/13; 381/15; 455/223
[58] Field of Search ............... 328/171, 167, 165, 169, 328/175; 307/547; 381/94, 13, 15; 455/223, 225

[56] References Cited

U.S. PATENT DOCUMENTS

| | | | |
|---|---|---|---|
| 4,204,170 | 5/1980 | Kage | 328/171 |
| 4,208,634 | 6/1980 | Peek et al. | 381/94 |
| 4,256,975 | 3/1981 | Fukushima et al. | 328/171 |
| 4,435,618 | 3/1984 | Fujishima | 381/94 |
| 4,571,548 | 2/1986 | Jordan | 328/167 |

OTHER PUBLICATIONS

Lancaster, Active Filter Cookbook, p. 91, 1979.

*Primary Examiner*—Forester W. Isen
*Attorney, Agent, or Firm*—Hughes & Multer

[57] ABSTRACT

A tuner includes circuitry for conditioning an audio signal including (i) a pilot signal canceller, (ii) a noise limiter, (iii) a notch filter, and (iv) a de-emphasizer; as well as an attenuator for RF signals. In an exemplary embodiment, an AM stereo pilot signal canceller utilizes a 25 Hz signal which is added or subtracted from the left and right channels to eliminate the pilot signal. The noise limiter includes a capacitor which is switched into the feedback circuit of an operational amplifier when the input is at a selected level. The diverting of the feedback signal to the capacitor causes the amplifier to saturate thereby removing the noise from the signal. The notch filter includes first and second band pass filters which are centered at a selected frequency, e.g. 10 kHz, for removing a 10 kHz beat note. The passed band is phase shifted so that it is 180 degrees out of phase with the original signal and then added back with the original signal to remove the selected band. The de-emphasizer performs a shelving function to attenuate an audio signal which has been compressed prior to broadcast transmission. The RF attenuator includes a light dependent resistor which forms a part of a voltage divider and which is remotely switched at the tuner to eliminate feeding the RF signal to a front panel switch.

13 Claims, 8 Drawing Sheets

APPARATUS AND METHODS FOR REMOVING UNWANTED COMPONENTS FROM A COMMUNICATIONS SIGNAL

TECHNICAL FIELD

The present invention pertains to apparatus and methods for (i) removing unwanted components such as noise, stereo pilot signals, beat notes and pre-emphasis from the audio signal in a radio receiver, and (ii) for attenuating RF signals.

BACKGROUND OF THE INVENTION

Historically the frequency response of amplitude modulated (AM) radio receivers has been quite limited. In the United States, the Federal Communications Commission limits the AM bandwidth of a broadcast signal to about 5 kHz. Some AM receivers have even narrower bandwidths.

The narrow frequency response has contributed to a rise in FM broadcasting and a corresponding decline in AM radio. In order to counteract this decline, attempts have been made to improve the sound generated by an AM receiver. For example, for a number of years some AM broadcasting stations have been employing what is known as multiband "compression equalization" to improve the sound of the broadcast. Compression equalization involves amplitude compression of the higher amplitude signals, particularly at the upper end frequencies. It is believed that by decreasing the amplitude range between the higher amplitude and lower amplitude signals, the generated sound will appear to have an improved frequency range.

More recently, AM stereo broadcasting systems have been utilized in which two signals are transmitted on a single carrier. A compatible AM stereo receiver removes the audio signals from the carrier and generates left and right channel signals. A conventional AM stereo broadcast system is described in U.S. Pat. No. 4,218,586 by Parker et al, as well as U.S. Pat. No. 4,192,968 by Hilbert et al; both of these patents being incorporated herein by reference. In any AM stereo broadcast transmission, there is a 25 Hz subcarrier pilot signal present on the AM carrier signal. The presence of this pilot subcarrier notifies the AM stereo receiver that the signal is being broadcast in stereo in order to activate the proper decoding circuitry for generating the left and right channel stereo components.

It also has been desirable to maximize the frequency response of the AM receiver. Although the broadcasts are limited to a 5 kHz bandwidth, there are attenuated signals present which are above the 5 kHz corner frequency and which can be boosted after reception to improve the frequency response. It should be appreciated however, that utilization of improved audio components for reproducing these higher frequencies and for improving their fidelity is limited by the presence of noise, as well as the aforementioned stereo pilot signal and by the spectral distortion caused by compression equalization.

Additional problems associated with these wider band AM signals is the presence of 10 kHz beat notes which are generated by signals from two or more different stations having carriers which are 10 kHz apart. In a conventional AM receiver having a corner frequency of about 5 kHz, these beat notes were eliminated by notch filters having a fairly wide notch frequency. However, in a receiver having a frequency response above 10 kHz, this method of eliminating beat notes results in the loss of a significant portion of the frequency band.

SUMMARY OF THE INVENTION

The present invention pertains to a receiver system having circuitry for conditioning audio frequency signals, as well as for attenuating received RF signals. The audio conditioning circuitry includes (i) a pilot signal canceller, (ii) a noise limiter, (iii) a notch filter, and (iv) a de-emphasizer for attenuating signals which have been compressed prior to being broadcast.

More particularly, the noise limiter includes amplifier means having (i) input means for receiving a signal containing noise, (ii) output means for generating an output of the signal, and (iii) means for feeding the signal output to the input means to operate the amplifier means in a linear manner. The noise limiter also includes means for routing the output signal from the feedback means when the input signal is at a selected level, so as to divert the output signal from the input means. Furthermore, means are provided for setting the selected level so that the amplifier means reaches a saturation level to eliminate first components of the noise which are at or above the selected level.

In addition, the noise includes second components which are below the selected level. The routing means further includes means for causing the amplifier means to operate in a nonlinear manner when the input signal is at the selected level so that the second noise components which are below the selected level are amplified by the amplifier means to the saturation level in a manner to reduce the second noise components.

With regard to the notch filter, there is included filter means having (i) an output and (ii) an input for receiving a signal containing noise of a known frequency band; the filter means passing a selected frequency band of the signal to the output. The selected frequency band includes the noise frequency band. There is also provided phase shifting means for (i) receiving the selected frequency band as a first output from the filter means, (ii) for adjusting the first output so that the first output is opposite in phase to the noise frequency band of the input signal, and (iii) for providing a second output of the phase shifted first output. In addition, summing means are provided which include (i) a first input for receiving the second input, (ii) a second input, (iii) bypass means for feeding the signal to the second input, and (iv) means for combining the first input and the second input to generate a third output which includes the signal absent the noise frequency band.

The pilot signal canceller of the audio conditioning signal circuitry is utilized for attenuating a pilot signal from a stereo audio signal having a first channel with a first pilot signal, and a second channel with a second pilot signal which is opposite in phase to the first pilot signal. The pilot signal canceller includes means for providing a cancellation signal having a frequency which is a function of the frequency of the pilot signal and having the same phase as the first pilot signal and being opposite in phase to the second pilot signal. Also included are first means, including a first input for receiving the first channel audio signal and a second input for receiving the cancellation signal; the first means subtracting the first and second inputs from each other to generate a first output of the first channel audio signal having an attenuated pilot signal. In addition, second means are provided, including a third input for receiving the second channel audio signal and a fourth input for receiving the cancellation signal, for combining the third and fourth inputs to generate a second output of the second channel audio signal having an attenuated pilot signal.

With regard to the de-emphasizer, there is performed an operation for reducing the level of an AM audio frequency band signal which has been amplified by compression equalization prior to broadcast transmission. This operation includes the steps of receiving the audio frequency band signals, and attenuating these signals beginning at a first lower frequency where the signals have been amplified by compression. The attenuation is then terminated above a second upper frequency where the signals are no longer amplified by compression.

It is therefore an object of the present invention to provide apparatus and methods for removing unwanted components such as noise, compression equalization and pilot signals, from a communications signal.

BRIEF DESCRIPTION OF THE DRAWINGS

These and other objects and advantages of the present invention will become more readily apparent upon reading the following Detailed Description and upon reference to the attached Drawings, in which.

Figure 1:
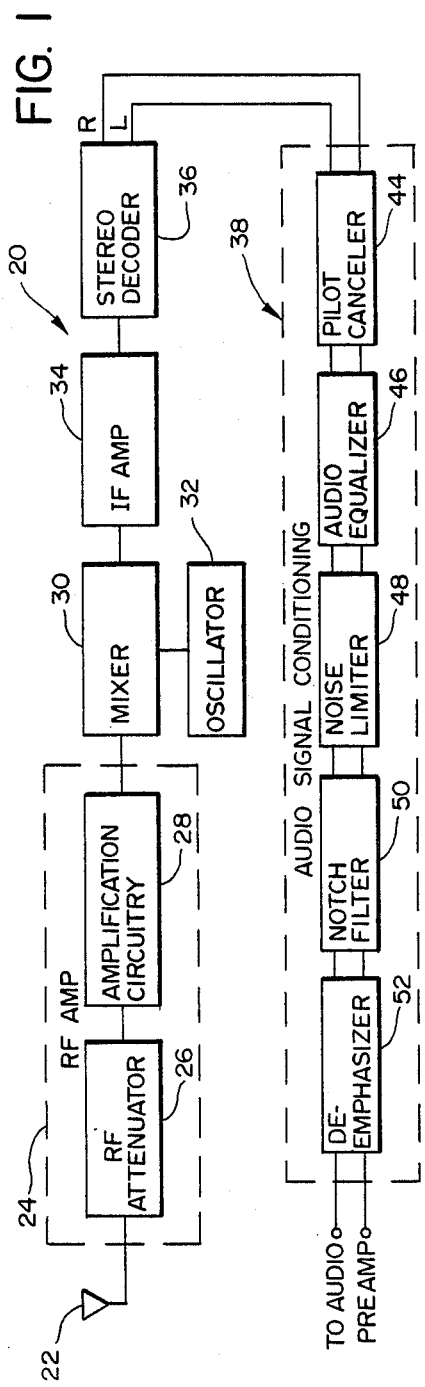
FIG. 1 is a block diagram showing the audio signal conditioning circuitry and RF attenuator circuitry incorporated in an exemplary AM stereo tuner.

While the present invention is susceptible of various modifications and alternative forms, specific embodiments thereof have been shown by way of example in the Drawings and will be described herein in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION

The present invention pertains broadly to processing circuitry for a communications signal. Although the present invention will be described in an exemplary embodiment with regard to processing circuitry for an AM stereo signal, it should be appreciated that a number of components described herein have a much broader application as will become apparent.

Turning now to FIG. 1, there is shown an AM stereo tuner receiver, generally indicated at 20, which includes a number of conventional components as well as the signal processing circuitry of the present invention. The receiver 20 includes an antenna 22 which receives AM monaural and stereo RF signals which are processed by an RF amplifier 24. The RF amplifier 24 includes (i) an RF attenuator 26 which attenuates very high RF signals in accordance with the present invention to maintain the RF amplifier circuitry in linear operation, as well as (ii) conventional RF amplification circuitry 28. The output from the RF amplifier is fed to a conventional superheterodyne which is mixed with a signal from an oscillator 32 to generate a conventional IF frequency signal which is fed to a conventional IF amplifier 34. The IF signal from the IF amplifier 34 is then fed to a conventional AM stereo decoder 36 which demodulates the IF signal and generates left and right channel audio stereo signals. In a preferred embodiment the stereo decoder 36 is an MC13020P AM Stereo Decoder manufactured by Motorola.

Located at the output of the stereo decoder 36 is audio conditioning circuitry of the present invention, indicated at 38, which removes various unwanted signals and noise from the left and right channel audio signals. From the audio signal conditioning circuitry 38, the audio signals are fed to a conventional audio frequency preamplifier and audio power amplifier (not shown).

Quite briefly, the audio conditioning circuitry 38 includes (i) a pilot signal canceller 44 for removing the aforementioned 25 Hz stereo pilot signal, (ii) a conventional audio equalizer 46 for boosting the signals at selected upper band frequencies, such as 7 kHz, 9 kHz and 11 kHz frequencies, (iii) a noise limiter 48, (iv) a notch filter 50 for removing the aforementioned 10 kHz beat notes, and (v) a de-emphasizer 52 for removing the compression equalization provided at the AM transmission site.

In the present application, the audio signal conditioning circuitry 38 will be described first beginning with the pilot signal canceller 44, and then later the RF attenuator 26 will be described.

I. Pilot Signal Canceller

Figure 2:
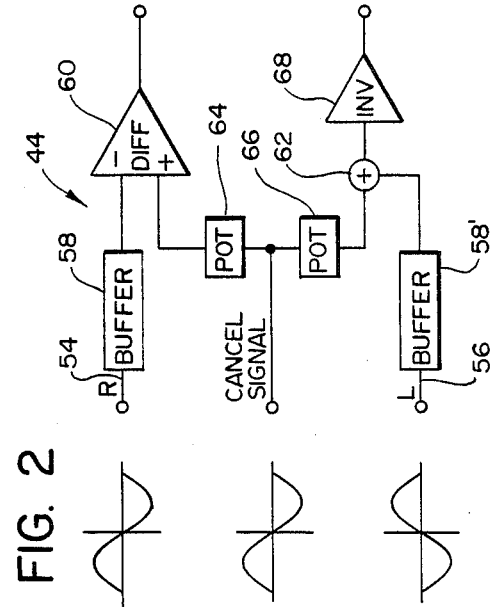
FIG. 2 is a more detailed circuit diagram of a first embodiment of the pilot signal canceller of the present invention.

As indicated in the Background of the Invention, all AM stereo transmissions include a 25 Hz subcarrier pilot signal which is included in the carrier to notify the stereo decoder that the received signal contains stereo information. However, on a wide band high fidelity receiver system, this pilot signal may be reproduced in the form of unwanted noise. In order to eliminate the pilot signal, pilot cancellation circuitry 44 is provided and which is shown in more detail in FIG. 2.

At the right and left inputs 54, 56, respectively, of the canceller 44, conventional right, left buffer amplifiers 58, 58', respectively, boost the audio signal as well as separate the audio conditioning circuitry from the previous stereo decoder stage. The output from the right buffer 58 is then fed to a first input of differential amplifier 60, whereas the output from the left buffer 58 is fed to a summing junction 62 In order to cancel the 25 Hz pilot signal, a 25 Hz cancellation signal is fed (i) to the second input of the differential amp 60 through an adjustable potentiometer 64, and (ii) to the summing junction 62 via an adjustable potentiometer 66.

It should be appreciated that while the audio signals as transmitted from the stereo decoder 36 to the right and left inputs 54, 56 are in phase, the pilot signals at these inputs are 180 degrees out of phase. More particularly, the cancellation signal is in phase with the right channel pilot signal so that they are cancelled out by the differential amp 60; whereas the cancellation signal and the left channel pilot signal are 180 degrees out of phase so that they are cancelled out at the summing junction 62 However, since the output from the differential amp 60 is inverted 180° from its input, the output from the summing junction 62 is fe to an inverting amplifier 68 to keep the left and right channels in phase.

In an exemplary embodiment utilizing the MC13020 P Stereo Decoder, the 25 Hz cancellation signal is provided in a conventional manner at the Q AGC output (pin 11) of the stereo decoder. This output drives a low pass filter through a 25 Hz band pass filter to a pilot decoder pin 14 as described in the Motorola MC13020P Advance Data Sheet ADI-725 which is incorporated herein by reference.

Figure 3:
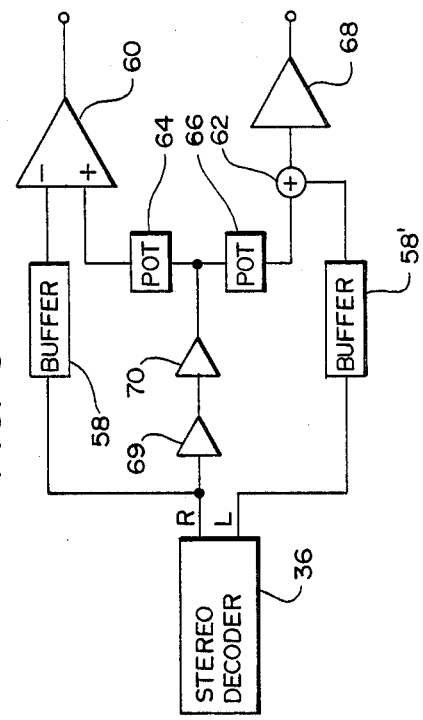
FIG. 3 is a circuit diagram of a second embodiment of the pilot signal canceller.

It should be appreciated however, that other sources of the required 25 Hz cancellation signal may include a 25 Hz signal obtained from the audio signal itself. This may be accomplished, for example, by feeding the left or right audio outputs of the stereo decoder 36 through a narrow band pass filter 69 (FIG. 3) centered around 25 Hz. The phase of the 25 Hz signal is adjusted by a phase shifter 70 so that aforementioned phase relationship between the cancellation signal and the pilot signals of the left and right channels is maintained.

The amplitudes of the cancellation signal going to the differential amp 60 and summing junction 62 are adjusted by potentiometers 64 and 66 so that the pilot signals and cancellation signal are exactly cancelled out. The potentiometers are set so that they attenuate the cancellation signal by approximately 20 dB.

Figure 4:
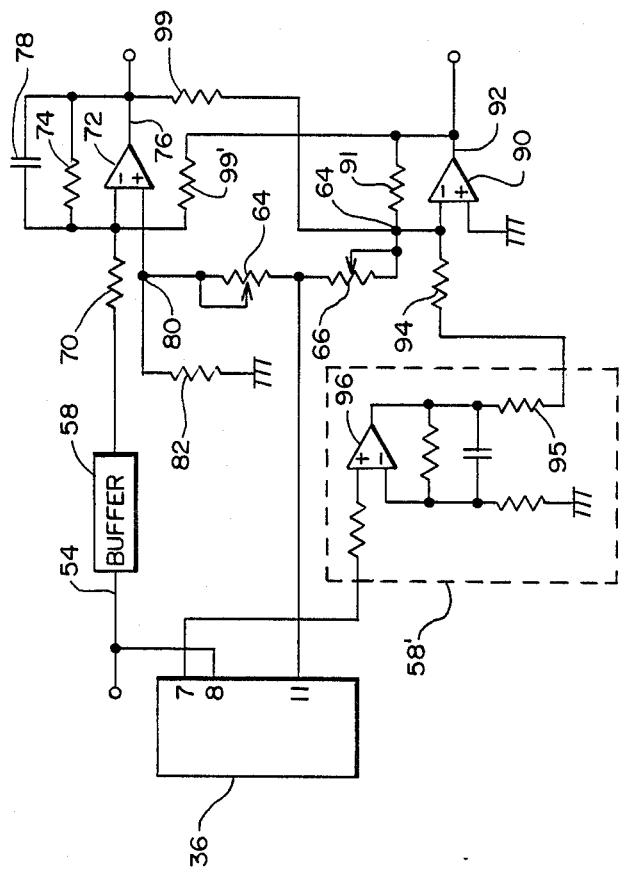
FIG. 4 is even a more detailed circuit diagram of the first embodiment of the pilot signal canceller.

In order to describe the cancellation circuitry in greater detail, reference is made to FIG. 4. Beginning with the output from the buffer 58, the audio signal is fed through an input gain resistor 70 to the inverting input of an operational amplifier 72. The gain of the amplifier 72 is further set by a feedback resistor 74 connected between the inverting input and the amplifier output 76. To eliminate high frequency oscillation, a capacitor 78 is connected across the feedback resistor 74.

The cancellation signal is fed from the Q AGC pin of the decoder 36 through both the potentiometer 64 and a junction 80 to the noninverting input of the operational amplifier 72. Adjustment of the right cancellation signal level is provided by a voltage divider formed by the potentiometer 64 and a resistor 82 tied between the junction 80 and ground. On the other hand, cancellation of the pilot signal at the left channel is provided by the cancellation signal which is fed through the potentiometer 66 to the summing junction 64; summing junction 64 being tied to the inverting input of an operational amplifier 90 The amplifier 90 is connected in an inverting configuration so that its noninverting input is tied to ground, and a feedback resistor 91 is connected between the output 92 and the inverting input via the summing junction 64. The gain of the amplifier 90 is further set by an input set resistor 94 which also acts as a summing resistor; resistor 94 being connected between the buffer 58 and the inverting input of amplifier 90. The level of the left channel cancellation signal is set by a voltage divider formed by potentiometer 66, resistor 94, and portions of the buffer 58' including a resistor 95 which is tied to the output of an operational amplifier 96 of buffer 58'.

In order to improve the sound qualities of the system by providing increased separation between the left and right channels, a load resistor 99 is connected from the output 76 of the right channel amplifier 72 through the summing junction 64 to the noninverting input of the amplifier 90. This results in about one percent of the output from the right channel amplifier 72 being fed to the left channel input to amplifier 90; the output from amplifier 72 being 180 degrees out of phase with the input to the left amplifier 90. Likewise, a load resistor 99' is connected between the output of the operational amplifier 90 and the inverting input of operational amplifier 72. This in turn results in about one percent of the output from the left channel amplifier 90 being fed to the right channel input amplifier 72. The resulting signal crossfeed provides additional separation between the left and right channels and improves the overall sound quality.

Figure 5:
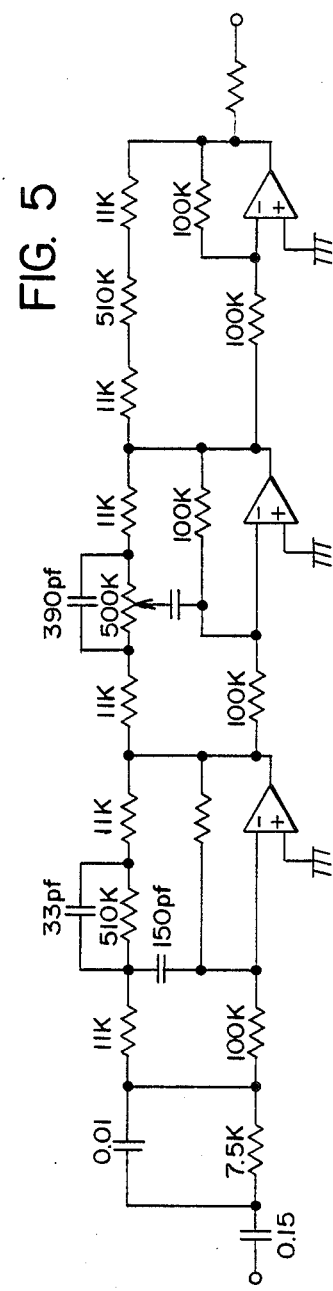
FIG. 5 is a circuit diagram of a conventional audio equalizer utilized in the audio signal conditioning circuit.

Having eliminated the pilot signal, the left and right channel audio signals are fed through a conventional equalization circuit shown, but not described, in FIG. 5. In this circuit, those components at 7 kHz, 9 kHz and 11 kHz are amplified to provide a flatter response across a frequency spectrum to about 15 kHz. Since the audio equalization circuitry for the left and right channels is identical, only one audio equalization circuit is shown.

II. Noise Limiter

Figure 6:
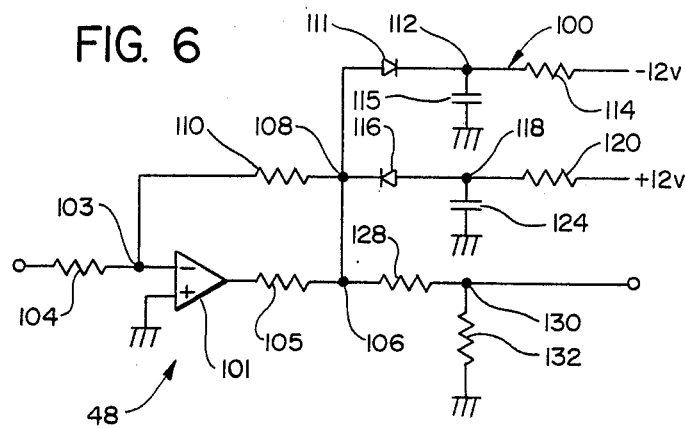
FIG. 6 is a detailed circuit diagram of the noise limiter of the present invention.

After being equalized, the left and right audio channel signals are fed through left and right noise limiting circuits, respectively; however only one of which is shown in FIG. 6 because the left and right circuits are identical.

The noise limiter includes a nonlinear network indicated at 100 which is tapped into the feedback loop of an inverting amplifier 101. More specifically, there is provided the operational amplifier 101 having a noninverting input tied to ground, and an inverting input 102 being tied through a feedback junction 103 and a gain set resistor 104 to the output of the audio equalizer circuit. Furthermore, the feedback loop is formed by a first feedback resistor 105 which has one end connected to the output of the operational amplifier 101 and the other end connected through an output junction 106 to a junction 108 of the nonlinear network 100. The feedback loop is completed by a second feedback resistor 110 which is connected at one end to the nonlinear junction 108 and at the other end to the feedback junction 103

It is a purpose of the nonlinear network 100 to cause the operational amplifier 101 to be driven into saturation so that (i) the level of positive and negative noise spikes present on the input signal are amplified in a nonlinear manner, and (ii) the noise spikes are removed at the saturation rail. This is accomplished by the nonlinear network 100 which includes a first network portion for causing nonlinear distortion of negative going input signals and noise spikes. More particularly, the first network portion includes a diode 111 which has its anode tied to the nonlinear network junction 108 and its cathode tied through a capacitor junction 112 and a resistor 114 to a negative voltage supply. A capacitor 115 is tied at one end to the capacitor junction 112 and the other end to ground. On the other hand, nonlinear distortion of the positive going input signals and noise spikes is achieved by a second network portion which includes a diode 116 which has its cathode tied to the nonlinear feedback junction 108 and its anode tied through a capacitor junction 118 to a resistor 120 which is connected to a positive voltage supply. The circuit is completed by a capacitor 124 which is connected between the capacitor junction 118 and ground.

Figure 7A:
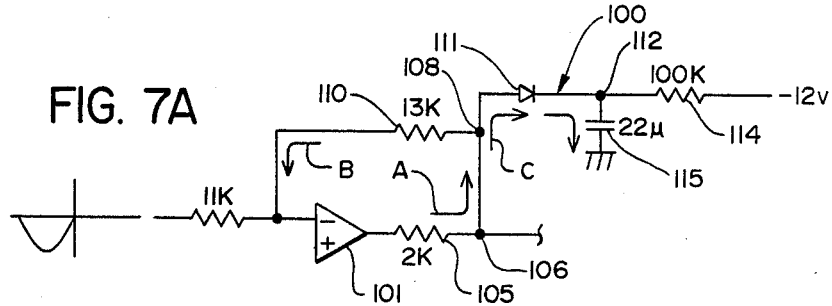
FIG. 7A is a circuit diagram of a portion of the noise limiter showing the direction of current flow when responding to a negative going input signal, and FIG. 7B. is a circuit diagram of a portion of the noise limiter showing the direction of current flow when responding to a positive going input signal.

In operation, a negative going input voltage to the amplifier 101 causes the amplifier 101 to act as a current source as shown by the current arrows A and B in FIG. 7A. During initial powerup, the diode 111 is nonconducting and the amplifier operates in a conventional linear manner through the feedback loop. However, when diode 111 becomes forward biased by the charging of capacitor 115 from the negative voltage supply through resistor 114, the current through the feedback loop is directed through the diode 111 as shown by the arrow C and into the capacitor 115. With the re-routing of the feedback signal to network 100, the amplifier 101 attempts to remove the voltage differential between its inverting and noninverting inputs by outputting more current into the capacitor 115. This results in the nonlinear amplification of both the input signal and the noise present on the signal, as well as the amplifier 101 being driven into saturation.

The noise clipping voltage is set by a voltage divider formed by the parallel resistors 105, 110 (FIG. 6) in series with the diode 111 and resistor 114. This voltage is set so that amplifier 101 saturation voltage corresponds to the peak of the audio signal. In this manner, all of the noise present at or above the clipping voltage is removed without significantly affecting the audio signal.

To allow the clipping voltage to be accurately set at junction 108, diode 111 is prebiased by the negative voltage supply and the capacitor 115. Thus at powerup, the capacitor 115 charges to about 0.6 volt below ground, at which time the diode 111 turns on and the amplifier 101 transitions from linear to nonlinear operation as the current is diverted to capacitor 115.

Figure 8A:
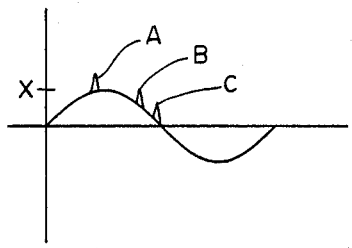
FIG. 8A is a wave diagram showing an input signal including noise spikes A, B, C thereon.
Figure 8B:
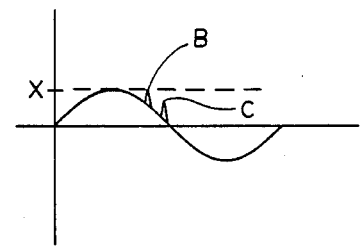
FIG. 8B is a wave diagram of a signal output when the signal of FIG. 8A is subjected to noise limiting by a conventional noise limiter.

It should be appreciated that the nonlinear amplification of the noise signals results in increased noise removal over conventional noise limiters. In particular, all the noise spikes which are amplified to the amplifier saturation level voltage are clipped in the present invention. For comparison, in a conventional clipping circuit a wave form shown in FIG. 8A is clipped, for example, at plus or minus x volts. Those portions of the noise spikes which extend above the conventional clipping level, are removed. However, those portions of the noise spikes which do not extend above the clipping level, are passed through unaffected as shown in FIG. 8B.

Figure 8C:
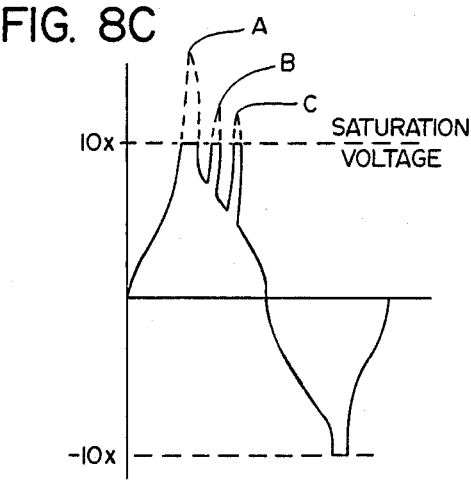
FIG. 8C is a wave diagram of the signal at the output of the noise limiting amplifier of the present invention.
Figure 8D:
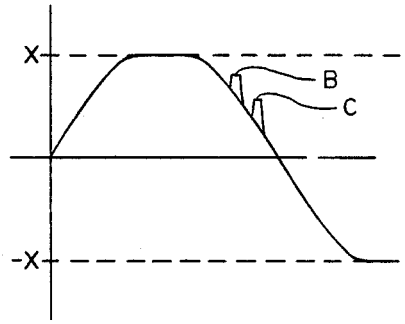
FIG. 8D is a wave diagram of the output when the input signal in FIG. A is subjected to the noise limiter of the present invention.

In the present invention however, all of the noise spikes are amplified in a nonlinear manner when the current is diverted to the nonlinear network 100 to charge capacitor 115. Therefore many of the noise spikes which are present in the lower portion of the audio signal are also amplified to the clipping level set by the rail voltage of the amplifier. More specifically, as shown in FIG. 8C, at the output to amplifier 101 (FIG. 7A) noise spikes B, C are amplified to the rail voltage 10x so that only those portions of noise spikes B, C which do not reach saturation are passed through. This results in an output at junction 106 (FIG. 6) having the waveform shown in FIG. 8D. More particularly, the noise spikes B, C are clipped below plus or minus x volts.

To achieve effective noise clipping, the values of capacitor 115 and resistor 114, as well as the values of capacitor 124 and resistor 120, are set to allow the capacitors to discharge sufficiently between adjacent positive or negative going signals to permit the capacitor to again re-charge. Preferably an RC time constant of about five milliseconds is used.

Figure 7B:
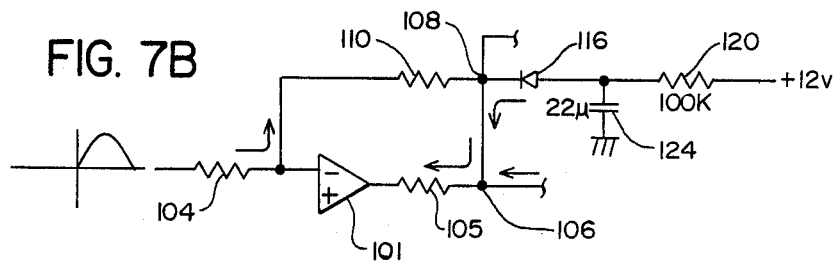

Although the previous discussion has concentrated on the operation of the noise limiter when the input to the amplifier 101 is a negative going signal, the operation is quite similar when a positive going signal is fed to the input to the noise limiter. In this case, the amplifier acts as a current sink as shown by the current arrows in FIG. 7B. When diode 116 becomes forward biased, the amplifier 101 transitions from linear to nonlinear operation and it is driven to its negative rail so that the noise present in the audio signal is removed as discussed previously To remove any unwanted gain generated from the noise limiting operation, the output 106 (FIG. 6) is fed through a voltage divider attenuator formed by a resistor 128, one end of which is tied to the output 106, and the other end of which is tied to a junction 130; the junction 130 being tied through a resistor 132 to ground.

III. Notch Filter

Figure 9:
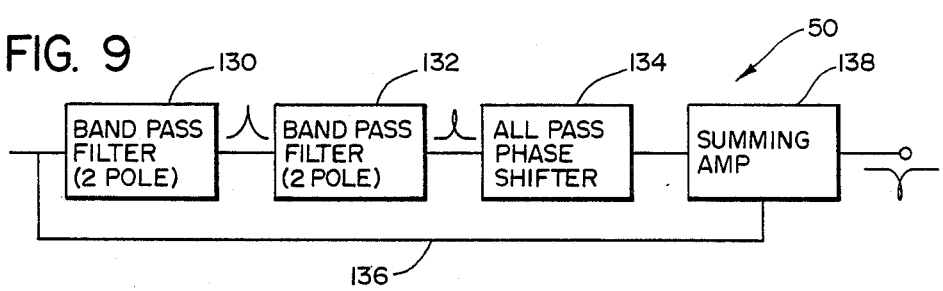
FIG. 9 is a block diagram of the notch filter of the audio signal conditioning circuitry.
Figure 10:
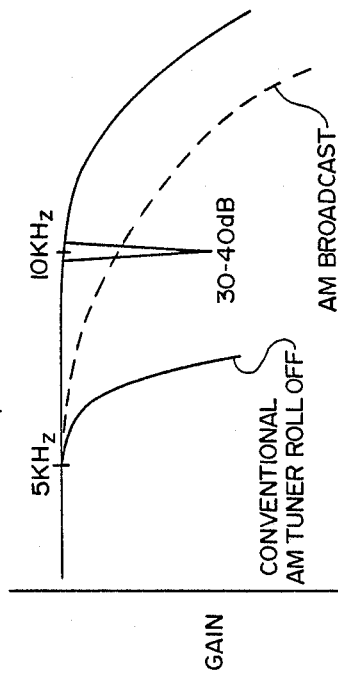
FIG. 10 is a frequency diagram showing the frequency response of (i) a conventional AM broadcast signal, (ii) a conventional AM receiver, and (iii) an exemplary stereo tuner.

After the noise limiting function has been performed, the left, right audio signals are fed through identical left and right notch filters 50, respectively, only one of which will be described herein. Turning now to FIG. 9, there is shown a block diagram of the notch filter of the present invention. In an exemplary embodiment, the notch filter 50 is provided to eliminate the 10 kHz beat notes described in the Background of the Invention. To eliminate these beat notes without also eliminating the surrounding frequencies, a very narrow notch is required. This is shown more clearly by referring to the frequency diagram of FIG. 10 which shows the frequency response of a conventional AM receiver which rolls off quite steeply at about 5 kHz, and the frequency response of a typical AM broadcast signal which rolls off around 5 kH at a much slower rate.

In the present invention, the notch filter (FIG. 9) includes a first, two pole, band pass filter 130 centered at 10 kHz followed by a second, two pole, band pass filter 132 which in turn is connected to an all pass phase shifter 134. The input to the first band pass filter 130 is connected to a bypass loop 136 which feeds the audio signal around the band pass filters 130, 132 and the all pass phase shifter 134 to a summing amplifier 138. In this manner, the first and second band pass filters form a four pole filter having a high Q and narrow bandwidth to pass a band of about 50 Hz centered around a frequency of 10 kHz. Since the filters generate a phase shift of about 360 degrees, the all pass phase shift 134 adjusts the phase shift of the signals output from filter 132 so that they are 180 degrees out of phase with the input at filter 130. Thus, when the unfiltered audio signals fed through the bypass loop 136 are added to the phase shifted, narrow band notch at summing amplifier 138, the output from the summing amplifier 138 is a wide band audio signal absent the narrow 10 kHz band containing the 10 kHz beat notes.

Figure 11:
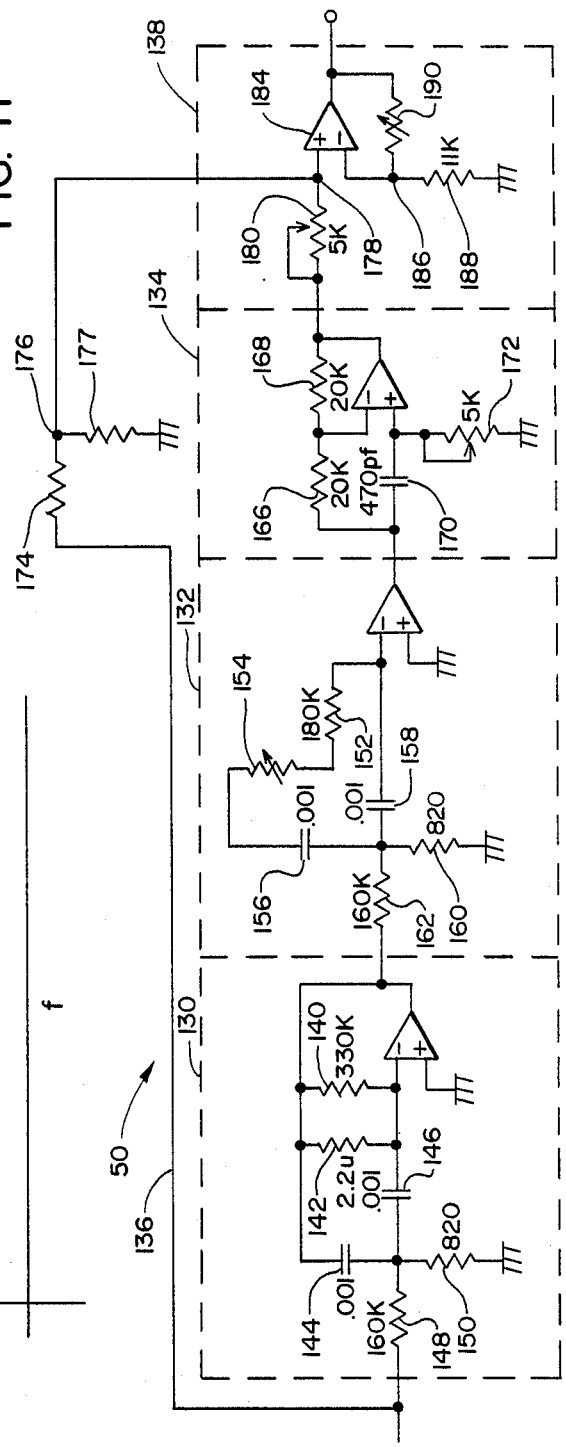
FIG. 11 is a detailed circuit diagram of the notch filter of the present invention.

Referring now to FIG. 11, the notch filter 50 is shown in more detail. The first band pass filter 130 is a conventional band pass filter which is slightly offset from the center frequency, i.e. 10.402 kHz, to provide a summed phase shift at the output of filter 132 of greater than −360 degrees. This is done so that the phase shifter 134, which operates through a range of about −180 degrees to about −270 degrees, is centered up in its effective range. Thus, the resistor and capacitor values are selected to satisfy the conventional equation, $$f_c = \frac{1}{2\pi C_{144}} \frac{(R_{148} + R_{150})(R_{140} + R_{142})}{(R_{148})(R_{150})(R_{140})(R_{142})}.$$

where $R_{140}$, $R_{142}$, $R_{148}$, $R_{150}$ and $C_{144}$ represent the values of resistors 140, 142, 148, 150 and capacitor 144, respectively. Likewise, filter 132 is a conventional two pole, band pass filter, except that potentiometer 154 (FIG. 11) is added to align the frequency of the filter 132 with the center frequency of filter 130. The component values for filter 132 are selected utilizing the conventional formula $$f_c = \frac{1}{2\pi C_{144}} \frac{R_{162} + R_{160}}{(R_{162})(R_{160})(R_{152} + R_{154})}.$$

By utilizing two band pass filters in series, a narrow pass band is generated. Additional filters may be added, however the further narrowing of the band pass is not enough to warrant these further additions.

The transfer function for the two band pass filters 130, 132 is set forth in the equation:

$$H(f) = 20\log\left[\frac{H_o^2}{1+Q^2\left(\frac{f-f_{C1}}{f_{C1}-f}\right)^2}\right]^{\frac{1}{2}}\left[\frac{H_o^2}{1+Q^2\left(\frac{f-f_{C2}}{f_{C2}-f}\right)^2}\right]^{\frac{1}{2}}$$

In the above equation, Q is selected to be about 15.8 for each filter in order to maximize selectivity and to avoid oscillation. $H_o$ is equal to the filter gain, $f_{C1}$ is the center frequency of the first filter 130, and $f_{C2}$ is the center frequency of the second filter 132. When H(f) is plotted, the output has a pass band at the 3 dB down point of about 50 Hz centered around 10 kHz.

In order to cancel the 10 kHz beat notes present in the audio signal, phase shifter 134 is adjusted to shift the pass band −180 degrees from the phase at the input to the first filter 130. The phase shifter 134 is a conventional lead phase shifter having component values selected in accordance with the equation:

$$O = -180° - 2\tan^{-1}(2\pi f R_{172} C_{170}),$$

where f is the frequency of the signal $R_{172}$ is the value of resistor 172, and $C_{170}$ is the value of capacitor 170. In the present invention, $R_{172}$ is adjustable to compensate for any variance in the phase shift out of filters 130, 132 due to component tolerance.

Bypassing of the wide band audio signals around the filters 130, 132 is provided by the feedback loop 136 which is tied to the upstream end of $R_{148}$ and which includes a resistor 174 which is tied through a resistor junction 176 to a summing junction 178; another resistor 177 being tied from the resistor junction 176 to ground. In order to adjust the level output of the phase shifter 134 so that it is at the same level as the 10 kHz portion of the bypassed audio signal, a potentiometer 180 is connected between the phase shifter output and resistor junction 178. A voltage divider attenuator is formed by the potentiometer 180 as well as the bypass resistors 174, 177 and the resistors 105, 128, and 132 of the noise limiter (FIG. 6).

Summing of the band pass signal with the bypassed audio signal is accomplished by the summing amplifier 138 which includes a noninverting operational amplifier 184 having its noninverting input tied to the summing junction 178 and its inverting input tied through a feedback junction 186 and a resistor 188 to ground. To provide adjustable gain to balance the left and right channel audio signals, an adjustable feedback resistor 190 is tied between the output of amplifier 184 and the feedback junction 186.

IV. De-emphasizer

After having removed the 10 kHz beat notes, the audio signal is fed to the de-emphasizer circuit 52 (FIG. 1). Prior to incorporation of de-emphasizer 52, it was found when utilizing the AM tuner of the present invention that the sound generated when receiving some AM broadcasts was altered spectrally; or in other words, the originating AM broadcast as transmitted did not have a flat frequency response across its bandwidth. More particularly, the sound output of the tuner when connected to a conventional pre-amplifier, amplifier and loud speakers, was tested by modulating an AM transmitter signal with the output of a compact disc player, and then transmitting this modulated signal to the tuner of the present invention. This resulted in a sound generated from the tuner and aforementioned conventional components which had good tonality. However, when the same tuner was tuned to an AM broadcasting station, the sound quality was substantially reduced. It was believed that this decrease in sound reproduction when tuned to the AM station was due to compression equalization.

Figure 12A:
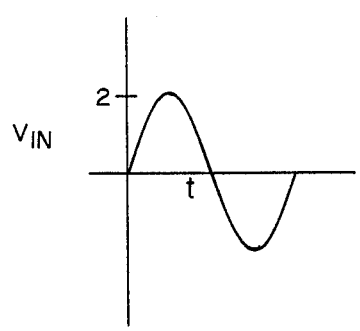
FIGS. 12A and 12B are wave diagrams showing conventional AM audio compression equalization.
Figure 12A:
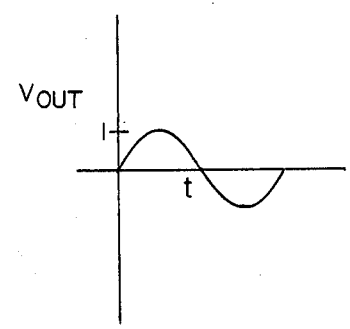
Figure 12B:
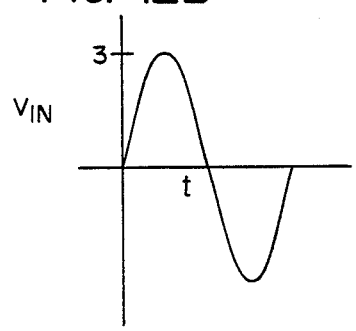
Figure 12B:
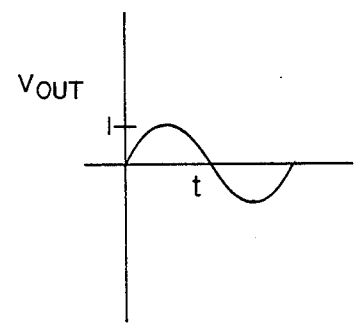

As explained in the Background, it is common for AM broadcasting stations to compress the amplitude of the signals prior to transmission. This is accomplished by means of a conventional multiband compressor which for a given amplitude range of input voltages generates a smaller range of output voltages. In effect, the gain for the smaller amplitude signals is greater than the gain for the larger amplitude signals resulting in envelope distortion of the audio signal and loss of fidelity. This may be explained in a very simplified manner by referring to FIGS. 12A and 12B where there are shown input signals having peak-to-peak voltages of 4 volts and 6 volts, respectively, before compression. In a typical compression equalization, these peak-to-peak amplitudes may be compressed down to 2 volts, for example. Thus, when the output before compression would have swung between plus and minus 3 volts, after compression the output is maximized around plus or minus 1 volt. It has been found in the present invention that different broadcasting stations amplitude compress in different manners. In addition, in multiband compression it is typical for different frequency bands to be compressed in different amounts, with the upper end frequency band near 5 kHz being compressed the greatest. On the average, it has been found that due to amplitude compression equalization there is an increase in gain of the signals between about 950 Hz and about 5 kHz of about 6 dB per octave as shown in the frequency response curve in FIG. 13A.

Figure 13A:
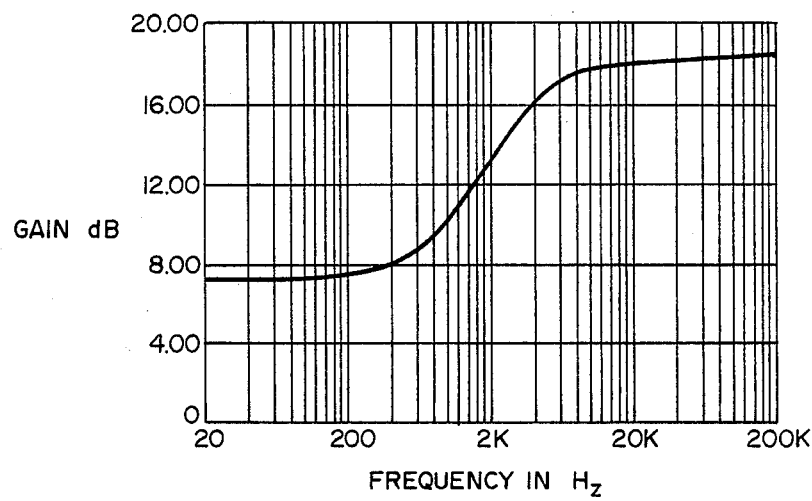
FIG. 13A is a frequency diagram of an AM broadcast output when subjected to compression equalization.

The frequency response curve of FIG. 13A was generated by utilizing a Carver TX-11A tuner to receive an AM/FM simulcast A Urie Model 537 Graphic Equalizer, having a ⅓ octave equalization capacity, was connected to the AM side of the tuner. A reference was provided by the FM broadcast because it was believed that the FM signals were not subject to amplitude compression equalization By switching between the AM and FM portions of the simulcast, the graphic equalizer was adjusted by listening to the AM and FM broadcasts, so that the sound output of the AM side approximated that of the FM side. The gain settings of the graphic equalizer were measured by inputting various audio frequency signals between about 100 Hz and about 6 kHz into the graphic equalizer, and measuring the output with an AC voltmeter. The output gain as a function of frequency was then plotted to generate the curve of FIG. 13A.

Figure 13B:
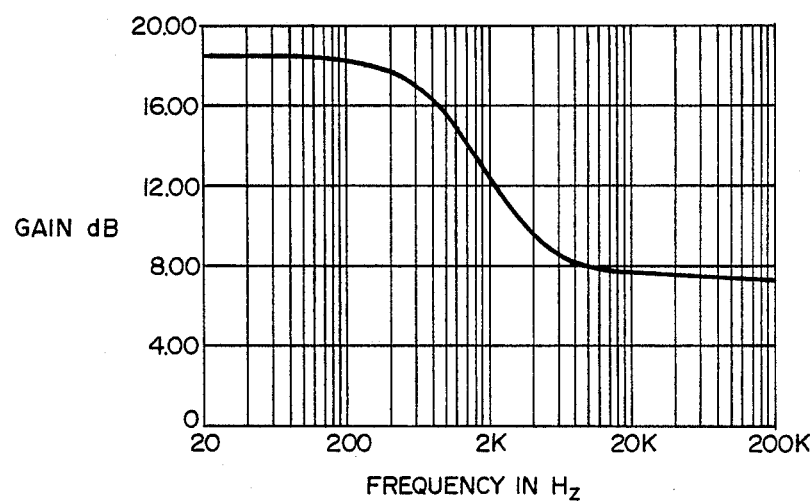
FIG. 13B is a frequency diagram of the filtering response of the de-emphasizer circuit of the present invention.
Figure 14:
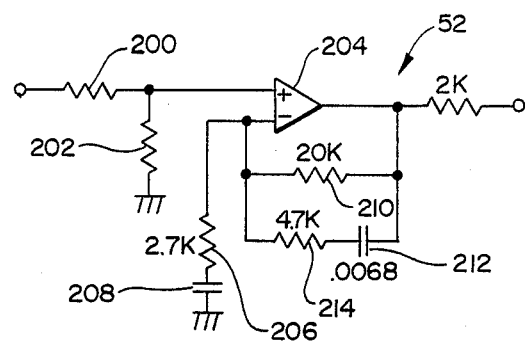
FIG. 14 is a detailed circuit diagram of the de-emphasizer of the present invention.

In order to remove the gain caused by amplitude compression, in the present invention there is provided a shelving filter which attenuates the audio signal about 6 dB per octave between about 950 Hz and about 5 kHz, as shown by the frequency response curve in FIG. 13B. More particularly referring to FIG. 14, the output from the notch filter 50 is attenuated by about 15 dB by a voltage divider formed by the input resistors 200, 202. After being attenuated, the signal is fed to the noninverting input of an operational amplifier 204; the inverting input of the amplifier 204 being connected through a gain set resistor 206 and a DC blocking capacitor 208 to ground. Connected between the output and inverting input of the amplifier 204 is a feedback resistor 210. In order to set the corner frequency $f_c$ (pole) and shelf frequency $f_s$ zero), a capacitor 212 and a resistor 214 are connected in series across the feedback resistor 210. In this manner, the gain of the amplifier 204 is set by the combined impedance of the capacitor 212 and resistor 214 in parallel with the feedback resistor 210. Component values are determined in accordance with the conventional equations:

$$f_c = \frac{1}{2\pi(R_{210} + R_{214})C_{212}}, \text{ and} \quad (1)$$

$$f_s = \frac{1}{2\pi R_{214} C_{212}}, \quad (2)$$

where $f_c$ is the pole frequency, $f_s$ is the zero frequency, $R_{210}$, $R_{214}$ and $C_{212}$ are the values of resistor 210, resistor 214, and capacitor 212, respectively. Utilizing values for resistor 214 of 4.7 k, capacitor 212 of 0.0068 microfarads, and resistor 210 of 20 k, the corner frequency is about 950 Hz, the shelf frequency is about 5 kHz and the roll off is about 6 dB per octave. The resulting frequency response of the shelving filter is shown in FIG. 13B, with the increase in gain between 950 Hz and 5 kHz resulting from compression equalization being offset by the aforementioned filtering operation. In this manner, a frequency response which is flat or constant between about 20 Hz and about 15 kHz is generated.

V. RF Attenuator

Having described the audio signal conditioning, the remaining portion of the present invention pertaining to the RF attenuator 26 (FIG. 1) will be described.

Figure 15:
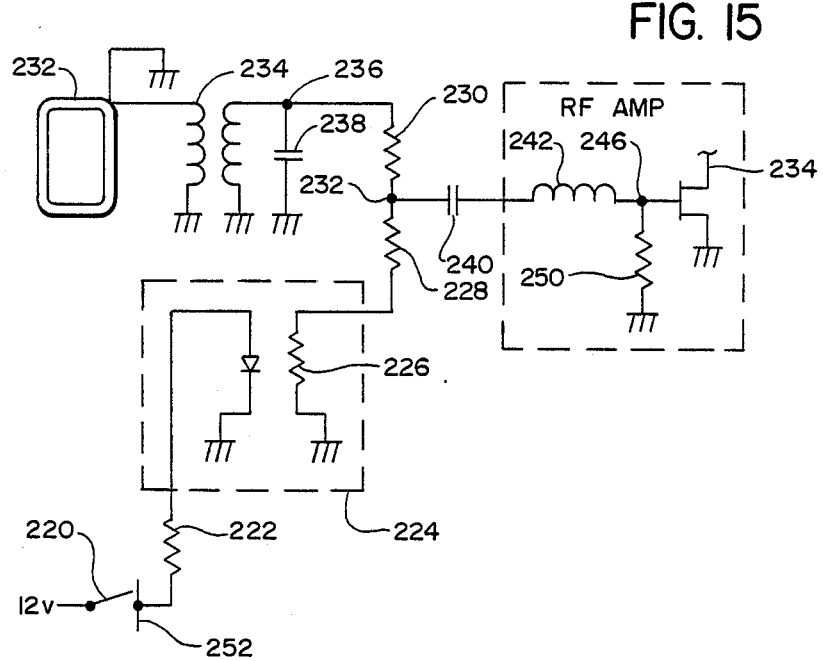
FIG. 15 is a detailed diagram of a portion of an RF amplifier section including the RF attenuator of the present invention.

In the present invention an RF attenuating function is achieved by means of a manually activated front panel switch 220 (FIG. 15) which is connected through a current limiting resistor 222 to a conventional light dependent resistor package (LDR) 224 such as the Clairex CLM-50. Attenuation is provided for those very strong signals which may drive the RF amplifier into nonlinear operation. The LDR package includes a resistor 226 which acts as the bottom leg of a voltage divider formed by resistors 226, 228, 230 and an antenna 232. Therefore, when the switch 220 is closed, the resistance of LDR resistor 226 decreases from about one megohm down to about 800 ohms, thereby decreasing the signal fed from output junction 232 located between resistors 228 and 230, to transistor 234 of the RF amplifier circuit.

More particularly, beginning at the input, a broadcast signal is picked up at the antenna 232 and fed to a conventional broadly tuned step up transformer 234. At the output of transformer 234 is a junction 236 to which a filtering capacitor 238 is tied to ground. Also tied to junction 236 is the first leg of the voltage divider which is formed by the resistor 230 which is tied at its output to the output junction 232. The second resistor 228 of the voltage divider is tied at its input to the output junction 232 and provides some stability to the light dependent resistor 226. Also tied to the output junction 232 is a decoupling capacitor 240 which is tied through an inductor 242 to a junction 246; the gate of field effect transistor 234 being tied to junction 246 along with a biasing resistor 250 to ground.

In the conventional circuits, the RF signal is fed through the switch 220 at the front panel 252 thereby routing the RF signal from the back end to the front end of the tuner. To avoid this, the present invention utilizes remote switching by means of LDR package 224 near the back end of the tuner to attenuate the RF signal near its input and to avoid the interference problems of routing the RF signals to the front panel as in conventional attenuators which are manually switched on and off.

What is claimed is:
1. In a radio tuner apparatus for reducing noise in an audio signal, said apparatus comprising:
   a. amplifier means including (i) input means for receiving an audio input signal, (ii) output means for generating an output of the signal, and (iii) feedback means for feeding said output signal to said input means to operate said amplifier means in a linear manner;

b. means for routing said output signal from said feedback means, when said input signal is at a selected level, so as to divert said output signal from said input means; and c. means for setting said selected level so that said amplifier means reaches a saturation level to eliminate first components of the noise which are at or above the selected level.

2. The apparatus as set forth in claim 1 wherein:

a. the noise includes second components which are below the selected level; and b. said routing means includes means for causing said amplifier means to operate in a nonlinear manner when said input signal is at said selected level so that said second noise components which are below said selected level are amplified by said amplifier means to said saturation level in a manner to reduce the second noise components.

3. The apparatus as set forth in claim 2 wherein said routing means includes:

a. charge storage means for receiving said output signal from said feedback means and for storing said signal therein; and b. switch means, which are in electrical communication with said feedback means, for routing said output signal to said charge storage means when said input signal is at or above said selected level.

4. The apparatus as set forth in claim 3 wherein:

a. said switch means includes a diode which is connected to said feedback means;

b. said charge storage means includes a capacitor which is connected to said diode; and c. said routing means includes means for biasing said diode so that said diode is conducting when said input signal is at or above said selected level, said biasing means including voltage supply means which are in electrical communication with said capacitor and said diode, and which charge said capacitor so that said diode is conducting.

5. The apparatus as set forth in claim 4 wherein:

a. said amplifier means includes an operational amplifier; and b. said feedback means includes (i) first resistive means which are connected to an output of said operational amplifier, (ii) second resistive means which are connected between said first resistive means and said input means, and (iii) a junction between said first resistive means and said second resistive means to which said routing means is connected.

6. The apparatus as set forth in claim 1 additionally comprising:

a. filter means, which include a filter output, and an input for receiving the audio input signal, for passing a selected frequency band of the audio input signal to said filter output, said selected frequency band including a noise frequency band;

b. phase shifting means for (i) receiving the selected frequency band as a first output from said filter means, (ii) for phase shifting said first output so that said first output is opposite in phase to a noise frequency band of the audio input signal, and (iii) for providing a second output of said phase shifted first output; and c. summing means including (i) a first input for receiving said second output, (ii) a second input, (iii) bypass means for feeding the audio input signal to said second input, and (iv) means for combining said first input and said second input to generate a third output which includes the signal absent the noise frequency band.

7. The apparatus as set forth in claim 6 wherein said filter means includes band pass filter means.

8. The apparatus as set forth in claim 7 wherein:

a. the signal is an audio signal;

b. the noise frequency band is a 10 kHz beat note;

c. said filter means includes first and second band pass filters connected in series and having respective 10 kHz center frequencies; and d. said summing means includes means for adjusting the level of said second output so that said level is substantially equal to the level of said noise frequency band.

9. Apparatus for reducing noise from a signal, the apparatus comprising:

a. amplifier means including (i) input means for receiving the signal, (ii) output means for generating an output of the signal, and (iii) feedback means for feeding said output signal to said input means to operate said amplifier means in a linear manner;

b. means for routing said output signal from said feedback means, when said input signal is at a selected level, so as to divert said output signal from said input means; and c. means for setting said selected level so that said amplifier means reaches a saturation level to eliminate first components of the noise which are at or above the selected level.

10. The apparatus as set forth in claim 9 wherein:

a. the noise includes second components which are below the selected level; and b. said routing means includes means for causing said amplifier means to operate in a nonlinear manner when said input signal is at said selected level so that said second noise components which are below said selected level are amplified by said amplifier means to said saturation level in a manner to reduce the second noise components.

11. The apparatus as set forth in claim 10 wherein said routing means includes:

a. charge storage means for receiving said output signal from said feedback means and for storing said signal therein; and b. switch means, which are in electrical communication with said feedback means, for routing said output signal to said charge storage means when said input signal is at or above said selected level.

12. The apparatus as set forth in claim 11 wherein:

a. said switch means includes a diode which is connected to said feedback means;

b. said charge storage means includes a capacitor which is connected to said diode; and c. said routing means includes means for biasing said diode so that said diode is conducting when said input signal is at or above said selected level, said biasing means including voltage supply means which are in electrical communication with said capacitor and said diode, and which charge said capacitor so that said diode is conducting.

13. The apparatus as set forth in claim 11 wherein:

a. said amplifier means includes an operational amplifier; and b. said feedback means includes (i) first resistive means which are connected to an output of said operational amplifier, (ii) second resistive means which are connected between said first resistive means and said input means, and (iii) a junction between said first resistive means and said second resistive means to which said routing means is connected.

* * * * *